(12) United States Patent
Beutler et al.

(10) Patent No.: US 10,007,874 B1
(45) Date of Patent: Jun. 26, 2018

(54) CLAMPING BOLT WITH INTEGRATED RFID TRANSPONDER

(71) Applicants: Balluff Gmbh, Neuhausen (DE);
Volkswagen AG, Wolfsburg (DE)

(72) Inventors: Robert Beutler, Denkendorf (DE);
Alexander Uhle, Zwenkau (DE)

(73) Assignees: Balluff GmbH, Neuhausen a.d.F. (DE);
Volkswagen AG, Wolfsburg (DE)

( * ) Notice: Subject to any disclaimer, the term of this patent is extended or adjusted under 35 U.S.C. 154(b) by 0 days. days.

(21) Appl. No.: 15/544,303

(22) PCT Filed: Jan. 19, 2015

(86) PCT No.: PCT/DE2015/100024
§ 371 (c)(1),
(2) Date: Jul. 18, 2017

(87) PCT Pub. No.: WO2016/116080
PCT Pub. Date: Jul. 28, 2016

(51) Int. Cl.
*G06K 19/06* (2006.01)
*G06K 19/077* (2006.01)
(Continued)

(52) U.S. Cl.
CPC ..... *G06K 19/07758* (2013.01); *B23Q 1/0072* (2013.01); *G06K 19/0723* (2013.01); *G06K 19/07773* (2013.01)

(58) Field of Classification Search
CPC ... G06K 19/07749; G07F 7/1008; G06Q 7/12
(Continued)

(56) References Cited

U.S. PATENT DOCUMENTS 7,246,980 B2 * 7/2007 Azzalin ................. F16B 41/005
292/327
8,596,134 B2 * 12/2013 Mekid ..................... F16B 31/02
73/760
(Continued)

FOREIGN PATENT DOCUMENTS

DE 10 2010 013 912 A1 10/2011
DE 10 2013 201 994 A1 8/2014
EP 2 363 235 A1 9/2011

OTHER PUBLICATIONS

International Search Report of PCT/DE2015/100024, dated Sep. 28, 2015.

*Primary Examiner* — Ahshik Kim
(74) *Attorney, Agent, or Firm* — Collard & Roe, P.C.

(57) ABSTRACT

An attachment for a clamping bolt has a base body and an opening which passes through the base body. Around the through-going opening runs a contact face which is positioned orthogonally on the longitudinal axis of the through-going opening and which is configured to make contact with the clamping bolt. A receptacle region runs around the through-going opening in the basic body, between the through-going opening and the contact face. An RFID transponder is arranged in the receptacle region. The clamping bolt has a circular-cylinder-shaped clamping region. A first boundary region and a second boundary region bound the clamping region along the longitudinal axis of the clamping bolt Each boundary region has a larger external diameter than the clamping region. The attachment is arranged on the first boundary region. A through-going opening runs along the longitudinal axis of the clamping bolt.

13 Claims, 4 Drawing Sheets

(51) Int. Cl.
 B23Q 1/00 (2006.01)
 G06K 19/07 (2006.01)

(58) Field of Classification Search
 USPC .......................................................... 235/492
 See application file for complete search history.

(56) References Cited

U.S. PATENT DOCUMENTS

| | | | | |
|---|---|---|---|---|
| 8,810,370 | B2* | 8/2014 | Tillotson | H04Q 9/00 |
| | | | | 340/10.1 |
| 9,063,069 | B2* | 6/2015 | Stickel | G01L 5/246 |
| 2003/0000314 | A1* | 1/2003 | Smith | G01L 1/2225 |
| | | | | 73/849 |
| 2006/0022056 | A1* | 2/2006 | Sakama | G06K 19/04 |
| | | | | 235/492 |
| 2011/0215511 | A1 | 9/2011 | Grob | |
| 2012/0198941 | A1 | 8/2012 | Smith | |
| 2018/0073542 | A1* | 3/2018 | Saigo | F16B 31/02 |

* cited by examiner

CLAMPING BOLT WITH INTEGRATED RFID TRANSPONDER

CROSS REFERENCE TO RELATED APPLICATIONS

This application is the National Stage of PCT/DE2015/100024 filed on Jan. 19, 2015, the disclosure of which is incorporated by reference. The international application under PCT article 21(2) was not published in English.

The present invention relates to an attachment for a clamping bolt. A RFID transponder is arranged in the attachment. Furthermore, the present invention relates to a clamping bolt that has the attachment according to the invention.

PRIOR ART

Zero-point clamping systems are provided to fix carrier components, in particular workpiece carriers or clamping plates, exactly in a predetermined position with repeat accuracy. They are used, for example, when processing cylinder heads and crank housings. The zero-point clamping modules to be used thus generally provide a receiver in which a clamping bolt can be inserted. Furthermore, clamping means are provided which act against the clamping bolt in a radially internal position and fix this in the locking position. In a radially external position of the clamping means, the clamping bolt can be removed from the clamping module.

The clamping bolt is usually equipped with a circular-cylindrically shaped base shape. A clamping region on the surface of the clamping bolt is provided to be contacted by the clamping means of the zero-point clamping module. This clamping region is bordered by a boundary region along the longitudinal axis of the clamping bolt in each case in both directions, said boundary region having a greater external diameter than the clamping region. In order to ensure an exact centring of the clamping bolt compared to the clamping module, a boundary region is generally formed as a conical section that comes to rest on a counter-cone on the clamping module side. In addition, force application sections are provided on this boundary region, which are able to be supplied with a clamping force acting in the axial direction. In doing so, the clamping bolt or the carrier component arranged on the clamping bolt fitted in the axial direction against the upper side of the clamping module. To connect the clamping bolt to the carrier component, the clamping bolt has a through opening along its longitudinal axis in which a screw can be inserted.

Such clamping bolts are known, for example, from DE 10 2010 013 912 A1. Clamping seats of zero-point clamping systems are known, for example, from DE 10 2013 201 994 A1.

When using clamping systems, the problem arises that a clamping bolt cannot be identified independently of the position without changing the function of the clamping bolt. A widespread means for identifying components is applying a RFID transponder. RFID (Radio Frequency Identification) is the name for a technology for automatically identifying and localising objects in a touch-free manner by means of radio waves. An integration of a RFID transponder into the base body of a clamping bolt is not possible since this usually consists of an electrically conductive metal and thus would shield the radio waves. At best, it would be conceivable to clamp the data carrier into the middle of the clamping bolt. In doing so, however, access to the screw of the clamping bolt is prevented, said screw connecting this to the carrier component. Thus, an increased effort when mounting the clamping bolt would emerge.

Therefore, the object of the present invention is to provide a clamping bolt that has a RFID transponder without the shape and the mechanical function of the clamping bolt thus being changed.

DISCLOSURE OF THE INVENTION

This object is solved by the attachment according to the invention for a clamping bolt. This has a base body and an opening passing through the base body. A contact surface runs around the through opening. The contact surface stands orthogonally on the longitudinal axis of the through opening. It is set up to contact the clamping bolt. A receptacle region runs around the through opening between the through opening and the contact surface in the base body. A RFID transponder is arranged in the receptacle region.

In principle, a conventional RFID transponder can be arranged in the attachment according to the invention. The RFID transponder preferably has an antenna that is arranged in the receptacle region around the through opening. If the through opening has a circular cross-section, the antenna can be arranged around the through opening in the receptacle region, for example, multiple times and in a circular manner. In this way, the attachment according to the invention can receive a long RFID antenna that enables data to be readout across greater distances.

Furthermore, it is preferred that the RFID transponder has a circuit board connected to the antenna. A data memory is arranged on the circuit board in a conventional manner, said data memory being able to store data for identifying the clamping bolt. Here, the data memory is a permanent memory. Further common components of the RFID transponder, such as an analogue switch circuit for receptacle and sending (transceiver), as well as a digital switch circuit that can be implemented, in particular, as a microcontroller, can also be arranged on the circuit board.

The circuit board is arranged in the receptacle region substantially in parallel to the through opening. It thus stands upright in the receptacle region. As a result, it occupies the space of the receptacle region substantially only in parallel to the longitudinal axis of the through opening, but not orthogonally thereto. As a result, the diameter of the attachment can be adapted to the dimensions of a clamping bolt without thus having to consider the construction space requirements of the RFID transponder.

The base body preferably consists of a plastic. As an electrically non-conductive material, such a plastic does not have any significant negative influence on the propagation of radio waves. While integrating the RFID transponder in a metal clamping bolt itself would not be possible, an attachment having a base body made of a plastic enables the arrangement of the RFID transponder on a clamping bolt. Materials that are particularly suitable for the base body are, in particular, polyamides, such as PA6 or PA12, for example.

According to the invention, materials having an electric conductivity of less than $10^{-8}$ S/m are in particular to be understood as electrically non-conductive materials.

The receptacle region is preferably filled with a filling material. This filling material is, in particular, electrically non-conductive, such that it does not exert a shielding effect on the antenna of the RFID transponder. The filling material prevents an unwanted position change of the RFID transponder in the receptacle region. In addition, it protects the RFID transponder from mechanical damage. Particularly suitable filling materials are thermoplastic plastics by means of which the receptacle region can be cast. These are selected, in particular, from the group of polyurethane casting resins.

It is particularly preferred that the filling material is arranged in the receptacle region in such a way that it forms a common plane with the contact surface. In this way, the filling material increases the contact surface and enables a particularly secure and fixed connection of the attachment to a clamping bolt by this being fastened to the attachment both via the contact surface of the base body and via the filling material.

Furthermore, it is preferred that the base body has recesses that extend through the contact surface. These enable an engagement with engaging elements of the clamping bolt provided for this. This increases the mechanical resilience of a connection between the attachment and the clamping bolt.

The attachment preferably has a greater cross-sectional surface area on its end facing towards the contact surface than on its end facing away from the contact surface. Thus, it forms the conical shape of conventional clamping bolts and can come into contact with a counter-cone of a clamping module.

The clamping bolt according to the invention has a circular-cylindrically shaped clamping region in the conventional manner. A first boundary region and a second boundary region border the clamping region along the longitudinal axis of the clamping bolt. To do so, each boundary region has a greater external diameter than the clamping region. A through opening runs along a longitudinal axis of the clamping bolt, said through opening being able to receive a screw for connecting the clamping bolt to a carrier component. The attachment according to the invention is arranged on the first boundary region. Together with the attachment, the clamping bolt according to the invention completes all tasks of a conventional clamping bolt. Thus, the RFID transponder enables the identification of the clamping bolt in the attachment independent of the location.

The through opening of the attachment and the through opening of the clamping bolt preferably have the same cross-section. According to the invention, cross section is understood as the shape and size of the cross-sectional surface that stands orthogonally on the longitudinal axis of the through opening. By doing so, the through opening made up of the through opening of the attachment and the through opening of the clamping bolt does not differ from the though opening of a conventional clamping bolt, such that it can complete the same task for the connection to a carrier component.

The resonance frequency of the RFID transponder is preferably adapted to the material of which the first boundary region consists. Even if the RFID transponder is surrounded by the material of the attachment and not by the material of the remaining clamping bolt, wherein it is, in particular, a metal, such as hardened steel, for example, the proximity of this metal nevertheless has an influence on the properties of the RFID transponder. In order to compensate for this effect specifically for the material of the first boundary region, a capacitor is provided, in particular, on the circuit board, the capacitance of which is chosen depending on the material of the first boundary region.

In order to prevent a detachment from the first boundary region, the contact surface of the attachment is preferably adhered to the first boundary region of the clamping bolt.

When the attachment has recesses, a further stabilisation of the connection between the first boundary region and the attachment can preferably be achieved by the first boundary region of the clamping bolt having several engaging elements, wherein each engaging element engages in one recess of the attachment.

The shape of the attachment and the shape of the first boundary region are preferably matched in such a way that the first boundary region, together with the attachment, forms a conical shape. As a result, the attachment and the first boundary region together come into contact with the counter-cone.

SHORT DESCRIPTION OF THE DRAWINGS

EXEMPLARY EMBODIMENTS OF THE INVENTION

Figure 1:
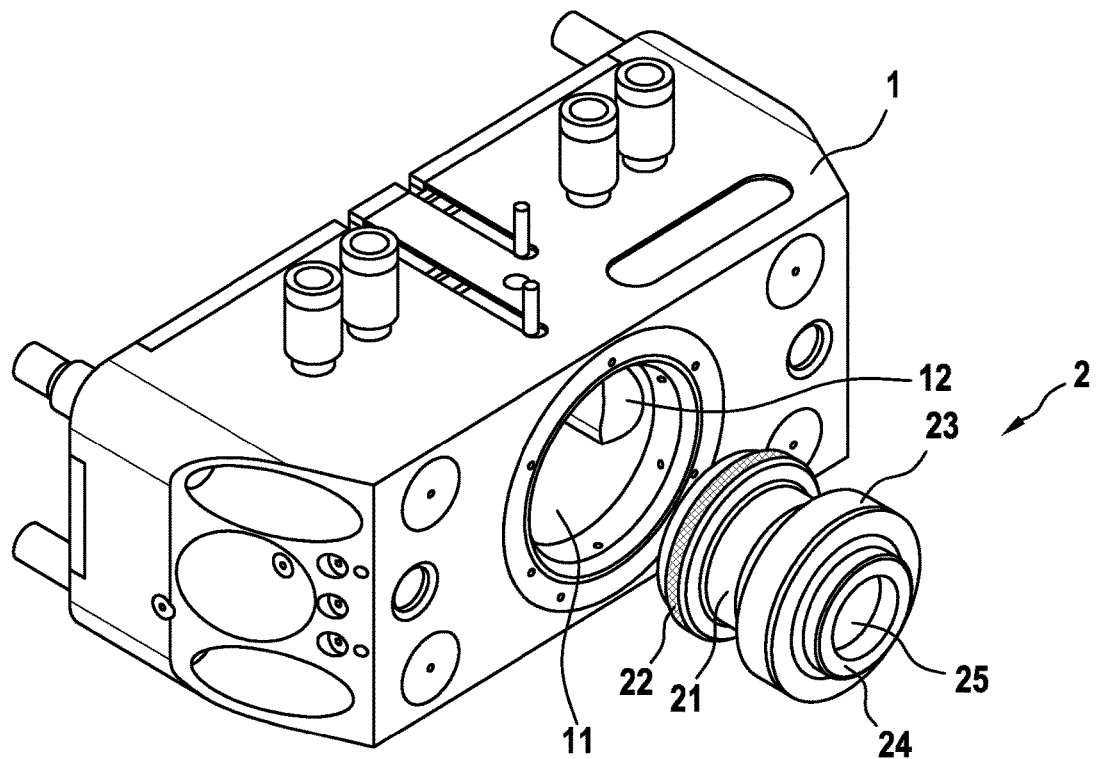
FIG. 1 shows an isometric depiction of a zero-point clamping module according to prior art.
Figure 2:
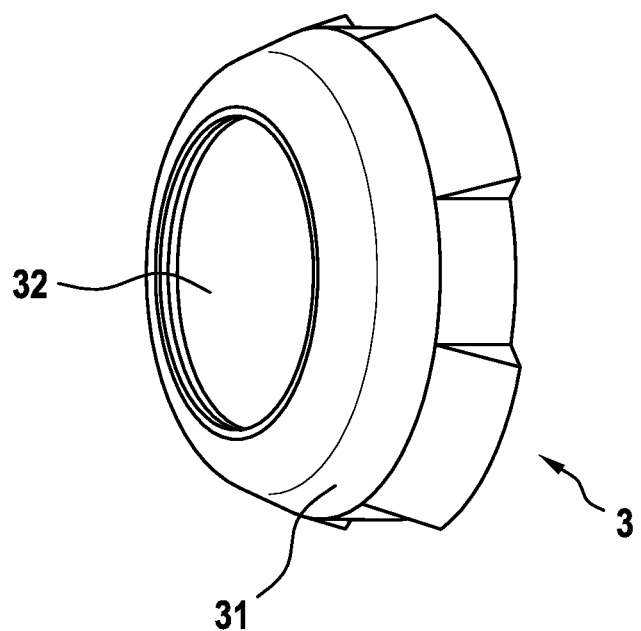
FIG. 2 shows an isometric depiction of an attachment according to an exemplary embodiment of the invention.
Figure 3:
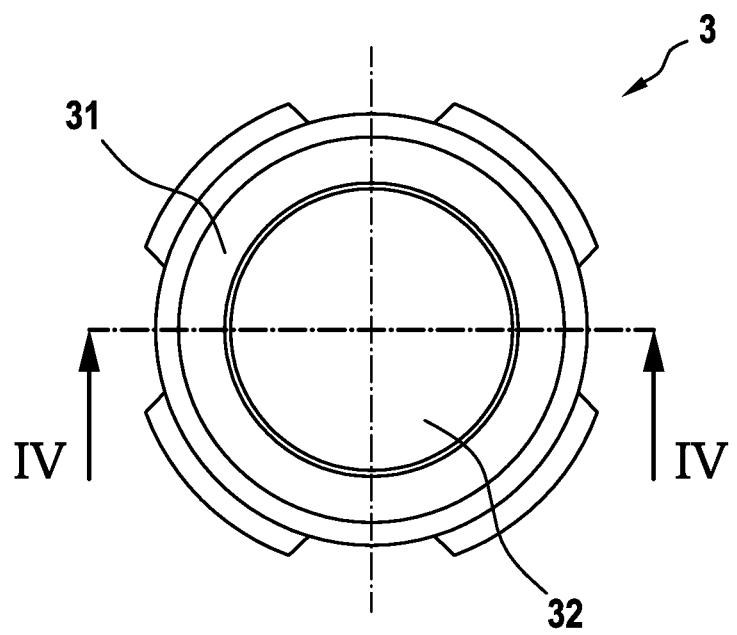
FIG. 3 shows top view of the attachment according to FIG. 2.
Figure 4:
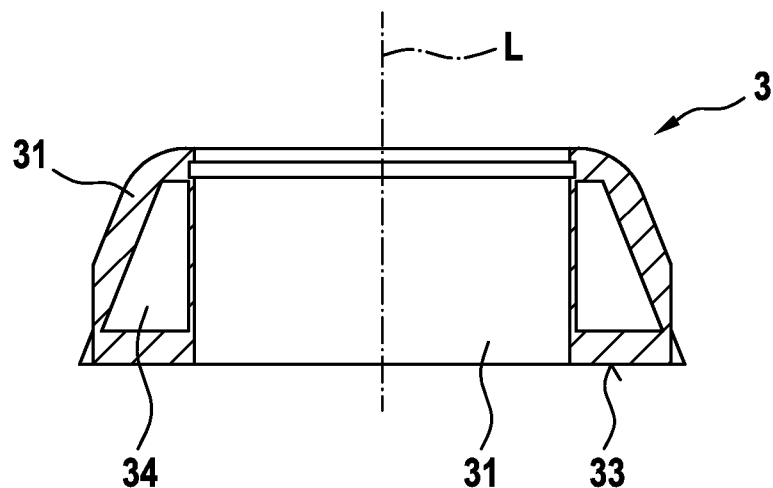
FIG. 4 shows a sectional depiction of the attachment according to FIG. 3 along the line IV-IV.
Figure 5:
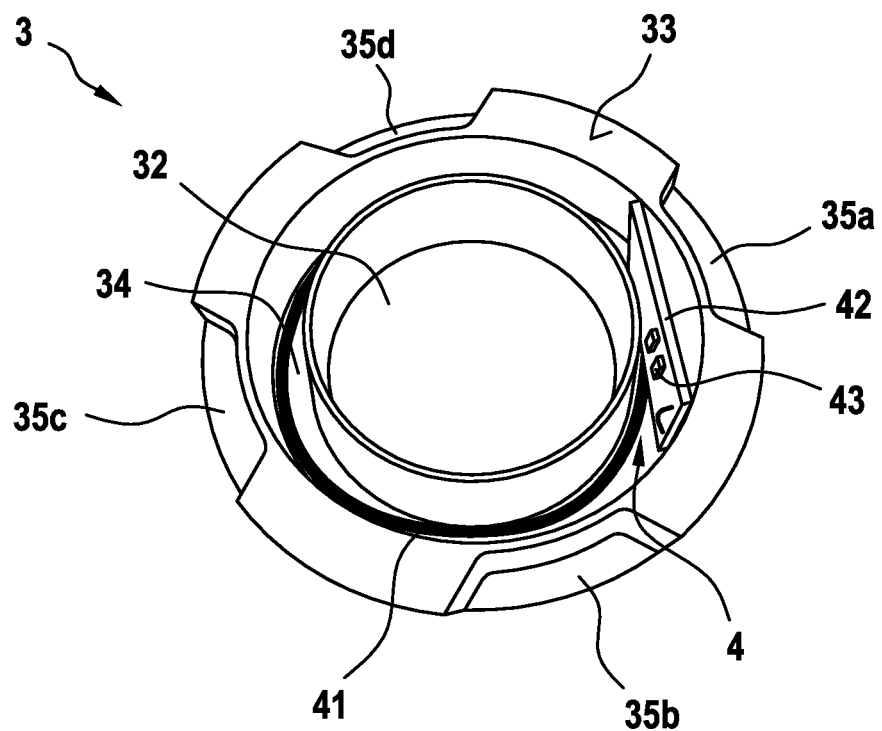
FIG. 5 shows an isometric depiction of the attachment according to FIG. 5 from its rear side by omitting the filling material contained in its receptacle region.

A conventional zero-point clamping system, as is known from DE 10 2013 201 994 A1, is depicted in FIG. 1. It has a clamping receiver 1, a circular-cylindrically shaped insertion opening 11 being found in the base housing thereof. Locking elements 12 are provided in the clamping receiver 1, said locking elements 12 being formed as sliders. They are able to be shifted from a radially external unlocking position into a radially internal locking position. When shifting the locking elements 12 into the radially internal locking position, a clamping bolt 2 inserted into the insertion opening 11 is firstly retracted into the insertion opening 11 and then locked in place there.

The clamping bolt 2 has a circular-cylindrically shaped clamping region 21. This is bordered by a conical first boundary region 22 and a conical second boundary region 23. When the clamping bolt 2 is inserted into the insertion opening 11 and the locking elements 12 are in their locking position, then the locking elements 12 abut on the locking region 21. The clamping bolt 2 has a seat 24 for abutting on a carrier component (not depicted). In order to connect the carrier component, which is a clamping plate, for example, or even a workpiece to be processed, fixedly to the clamping bolt, the clamping bolt has a circular-cylindrically shape through opening 25 along its longitudinal axis in which a screw can be inserted. The clamping bolt 2 consists of hardened steel.

An exemplary embodiment of an attachment 3 for a clamping bolt according to the invention is depicted in FIGS. 2 to 5. This has a base body 31 that consists of the plastic PA6 GF30. The base body is substantially conical. Its maximum diameter presently increases from 18 mm on its front side to 21 mm on its rear side. A circular-cylindrically shaped opening 32 with a diameter of 14.5 mm passes through the base body 31. It runs along the longitudinal axis L of the attachment 3. In the rear view of the attachment 3 shown in FIG. 5, it is depicted that this has a contact surface 33 on its rear side. Between the contact surface 33 and the through opening 32, a receptacle region 34 runs around the through opening 32. This extends along the longitudinal axis L of the attachment 3 over its entire length. A RFID transponder 4 is arranged in the receptacle region 34. This has an antenna 41 that is wrapped around the through opening 32 in several coils. It ends on a circuit board 42 on which a permanent data memory 43 is arranged. The data memory 43 is a data memory with up to 128 kB of memory capacity according to ISO15693. The circuit board stands upright in the receptacle region and is thus arranged substantially in parallel to the through opening 32. The receptacle region 34 is filled with a two-component resin based on polyurethane as the filling material in such a way that this, together with the contact surface 33, forms a common surface. Four recesses 35a-35d are formed in the contact surface 33. These are each radially open towards the external wall of the attachment 3.

Figure 6:
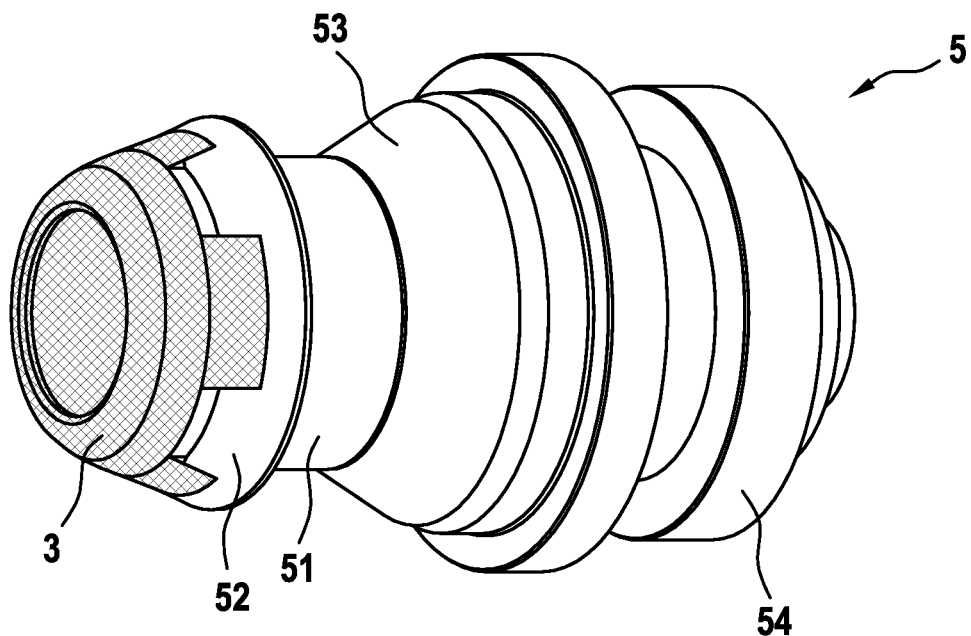
FIG. 6 shows an isometric depiction of a clamping bolt according to an exemplary embodiment of the invention.
Figure 7:
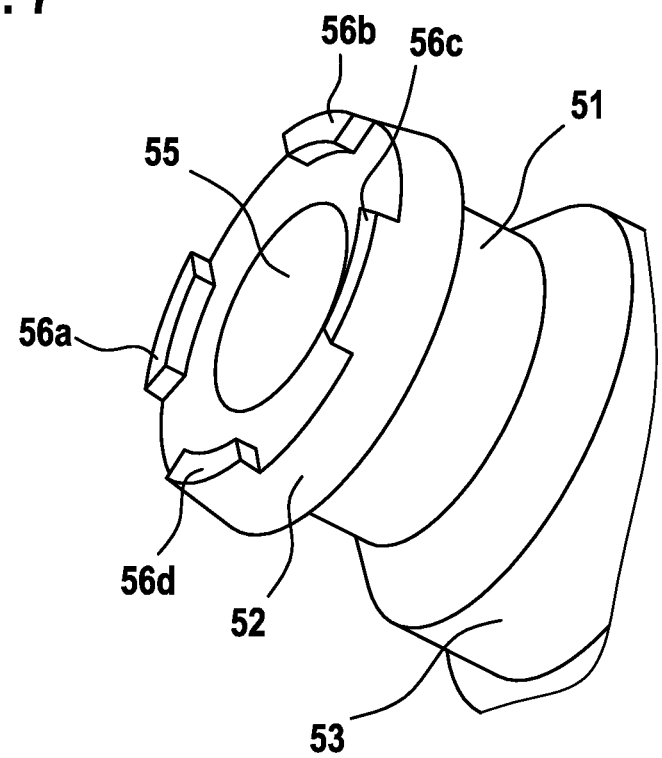
FIG. 7 shows a section of a clamping bolt according to an exemplary embodiment of the invention in an isometric depiction by omitting the attachment.

An exemplary embodiment of a clamping bolt 5 according to the invention is depicted in FIG. 6. This has a circular-cylindrically shaped clamping region 51 and two boundary regions 52, 53. The first boundary region 52 has the shape of a truncated cone. The second boundary region 53 is conical. A seat 54 for contacting a carrier component is found on the end of the clamping bolt facing away from the first boundary region 52. The attachment 3, according to the exemplary embodiment of the invention described above, is adhered to the first boundary region 52 by means of an epoxy resin. The first boundary region has four engaging elements 56a-d protruding in the longitudinal direction of the clamping bolt, said engaging elements engaging in the recesses 35a-d of the attachment 3 and thus absorbing the forces acting laterally on the attachment 3. The clamping bolt 5 has a through opening 55 that, just like the through opening 32 of the attachment 3, has a circular cross-section with a diameter of 14.5 mm. The clamping bolt according to the present exemplary embodiment of the invention can be introduced into the conventional clamping receiver 1 instead of the conventional clamping bolt 2. Thus, mechanical stresses caused by the locking elements 12 only act on the clamping region 51 and on the first boundary region 52 of the clamping bolt, but not on the attachment 3.

The clamping bolt 5 can be identified independently of its position by means of the RFID transponder 4. In order to minimise disturbing influences of the first boundary region 52 that also, like the clamping region 51, the second boundary region 53 and the seat 54, consists of hardened steel, on the RFID transponder 4, the resonance frequency thereof is adapted to the hardened steel. To do so, a suitable capacitor (not shown) is provided on the circuit board 42.

The invention claimed is:

1. A clamping bolt (5) having
a circular-cylindrically shaped clamping region (51),
a first boundary region (52) and a second boundary region (53) which border the clamping region (51) along the longitudinal axis of the clamping bolt (5), wherein each boundary region (52, 53) has a greater external diameter than the clamping region (51), and
a through opening (55) running along a longitudinal axis of the clamping bolt (5),
wherein an attachment (3) is arranged on the first boundary region (52), said attachment (3) having
a base body (31),
an opening (32) passing through the base body,
a contact surface (33) that runs around the through opening, said contact surface (33) standing orthogonally on the longitudinal axis (L) of the through opening (32), and that is adapted to contact the clamping bolt (5),
a receptacle region (34) running around the through opening (32) between the through opening (32) and the contact surface (33) in the base body, and
a RFID transponder (4) arranged in the receptacle region (34).

2. The clamping bolt (5) according to claim 1, wherein the RFID transponder (4) has an antenna (41) that is arranged in the receptacle region (34) around the through opening (32).

3. The clamping bolt (5) according to claim 2, wherein the RFID transponder (4) has a circuit board (42) connected to the antenna (41), on which a data memory (43) is arranged, wherein the circuit board (42) is arranged in the receptacle region (34) substantially in parallel to the through opening (32).

4. The clamping bolt (5) according to claim 1, wherein the base body (31) comprises a plastic.

5. The clamping bolt (5) according to claim 1, wherein the receptacle region (34) is filled with a filling material.

6. The clamping bolt (5) according to claim 5, wherein the filling material is arranged in the receptacle region (34) in such a way that it forms a common plane with the contact surface (33).

7. The clamping bolt (5) according to claim 1, wherein the attachment (3) has a larger cross-sectional surface on its end facing towards the contact surface (33) than on its end facing away from the contact surface (33).

8. The clamping bolt (5) according to claim 1, wherein the through opening (32) of the attachment (3) and the through opening (55) of the clamping bolt (5) have the same cross-section.

9. The clamping bolt (5) according to claim 1, wherein the resonance frequency of the RFID transponder (4) is adapted to the material of which the first boundary region (52) comprises.

10. The clamping bolt (5) according to claim 1, wherein the contact surface (33) of the attachment (3) is adhered to the first boundary region (52) of the clamping bolt (5).

11. The clamping bolt (5) according to claim 1, wherein the base body has recesses (35a-d) that extend through the contact surface (33).

12. The clamping bolt (5) according to claim 11, wherein the first boundary region (52) of the clamping bolt (5) has several engaging elements (56a-d), wherein each engaging element (56a-d) engages in one recess (35a-d) of the attachment (3).

13. The clamping bolt (5) according to claim 1, wherein the first boundary region (52), together with the attachment (3), forms a conical shape.

* * * * *